May 14, 1968          J. C. SIMEONE          3,382,689

IGNITION ALARM WITH FUEL SHUTOFF DEVICE

Filed May 13, 1966

INVENTOR.
JAMES C. SIMEONE
BY
ATTORNEY

United States Patent Office 3,382,689
Patented May 14, 1968

3,382,689
IGNITION ALARM WITH FUEL
SHUTOFF DEVICE
James Corradino Simeone, Rochester, N.Y., assignor of one-half to Ralph T. Cerame, Rochester, N.Y.
Filed May 13, 1966, Ser. No. 549,982
9 Claims. (Cl. 70—243)

ABSTRACT OF THE DISCLOSURE

When the key of the automobile is inserted in the rotatable barrel of the ignition lock, the key pushes in a plunger to close a switch against spring pressure, and simultaneously an arm, which is secured to the barrel engages two contacts in circuit with said switch to actuate an alarm. However, when the key rotates the barrel to start the automobile, the arm is disengaged to shut off the alarm, and simultaneously a solenoid is energized to open a shutoff valve and unblock the engine's fuel line. When the key is rotated back to stop the engine, the circuit is remade to the alarm and the solenoid is deenergized, so that the driver is warned against leaving the key and the fuel line is blocked.

---

This invention relates to automobile ignition systems, and more particularly to an alarm system operative when the ignition lock is turned off to remind the driver automatically to remove the key from the lock. This invention relates also to means for automatically blocking the fuel line of an automobile engine, when its ignition key is removed.

Each year thousands of automobiles are stolen by thieves whose activities are made simpler because a vast number of automobile owners forget to remove the keys from the ignition locks of their automobiles upon leaving the cars.

An object of this invention is to provide a warning system, which operates to alert the driver whenever an ignition key is at its OFF position in the ignition lock of a vehicle.

Another object of this invention is to provide means for automatically blocking the fuel line of a vehicle motor whenever the ignition of the vehicle is turned off.

A more specific object of this invention is to provide for the dashboard of a vehicle, a warning light and buzzer, which operate whenever the ignition key of the vehicle is turned off to remind the operator to remove the key from the ignition lock.

Other objects of the invention will be apparent hereinafter from the specification and from the recital of the appended claims, particularly when read in conjunction with the accompanying drawing.

Figure 1:
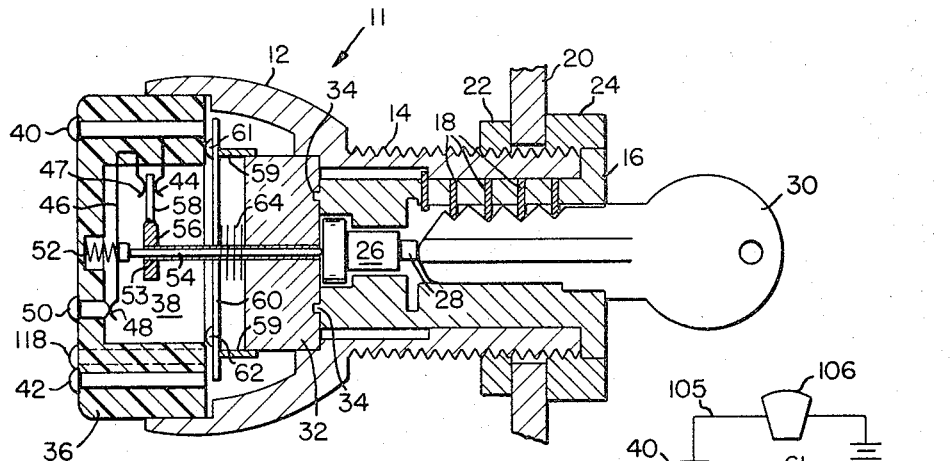
FIG. 1 is a longitudinal sectional view of an automobile ignition lock, made in accordance with one embodiment of this invention, the key therefor being shown in the lock.

The invention disclosed herein provides an audio and visual warning to an automobile driver, whenever the ignition key is turned off, which continues until the key is removed from the ignition lock, or alternatively, until the key is turned ot restart the vehicle. In conjunction with the warning system the invention also comprises a fuel blocking device, which operates automatically to stop flow of fuel to the fuel pump of the vehicle while the ignition key is turned off or removed from the ignition lock.

Referring now to the drawing by numerals of reference, 11 denotes an ignition lock which comprises a housing 12 which is generally bowl-shaped at its rear end and which has an integral, externally threaded sleeve or stem portion 14 projecting forwardly from the base. The lock is shown removably secured in an opening in the dashboard 20 of an automotive vehicle, by nuts 22 and 24, which thread onto the stem 14 and engage opposite sides, respectively, of panel 20.

Housed in conventional manner in the sleeve 14 is a rotatable barrel 16, and a plurality of tumblers 18, which function in a known manner to prevent the rotation of barrel 16 except by a proper key 30.

Mounted in the inner end of the barrel 16 coaxially thereof is an axially reciprocal plunger 26. At its outer end (right end in FIG. 1) the plunger 26 has an axial extension 28, which is engageable by the inner end of key 30, when the key is properly inserted into the barrel 16.

Seated in the bowl-shaped housing 12 over the inner ends of the barrel 16 and the plunger 26 coaxially thereof is a rotatable block 32. Integral with, and projecting slightly axially beyond the inner end of the barrel 16 are two teats 34, which seat in cooperating recesses formed in the confronting face of the block 32 to transmit the rotation of the barrel 16 to this block.

Secured to the rear end of the housing 12 in axially spaced relation to the block 32 is a generally cup-shaped insulating closure member 36, whose recessed portion 38 confronts block 32. Secured in closure 36 at diametrally opposite sides, thereof, and extending through the closure parallel to its axis are two, spaced, parallel conductor pins or terminals 40 and 42. Secured at one end to terminal 40, and projecting at its opposite end into the recess 38 is a flexible switch contact 44. Secured intermediate its ends in closure 36, and projecting at opposite ends thereof into the recess 38 is a conductor 46. At one end conductor 46 has formed thereon a flexible contact 47, which is disposed in spaced, confronting relation to contact 44. At its opposite end conductor 46 extends transversely across recess 38, and has formed thereon a further flexible contact 48, which is engageable with a pin or terminal 50 carried in the end of the closure 36. Seated in a recess formed in the end of the closure to engage contact 48 is a spring 52, which urges the contact 48 away from terminal 50.

Figure 2:
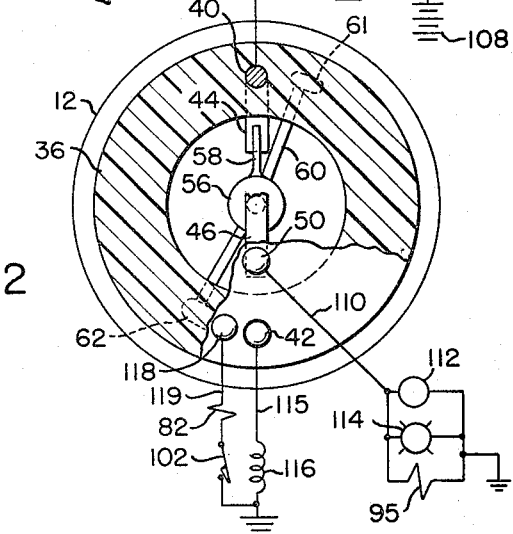
FIG. 2 is an end view of this lock as seen when looking at its left end in FIG. 1, a portion of the lock being cut away and shown in section, and the circuits associated with this lock being illustrated schematically.

Mounted in block 32 to rotate therewith is a sleeve 53 which has a pressed fit into the block. Mounted for limited reciprocation in the sleeve is a pin 54. At one end pin 54 engages plunger 26, and at its opposite end it engages conductor 46 opposite spring 52. Secured on sleeve 53 for rotation thereby is a dielectric bushing 56, which carries a conductor blade 58 that is engageable between the contacts 44 and 47, when block 32 and blade 58 are disposed as illustrated in FIGS. 1 and 2.

Supported by plates 59 on block 32 for rotation thereby is a further switch blade 60, opposite ends of which overlie the inner end of closure 36. Sleeve 53 passes through this blade. Adjacent opposite ends blade 60 is provided with contacts 61 and 62, which are engageable with the inner ends of the terminals 40 and 42 in one angular position of block 32.

A coiled torsion spring 64 surrounds the sleeve 53 between block 32 and blade 60, and operates in conventional manner to rotate the key from its automatic start, to its ON position, after the motor has been started.

Secured to a sleeve 70 (FIG. 3), which is removably mounted by coupling members 72 in the fuel line 73 of the vehicle, is a plate 74. Secured in the sleeve 70 intermediate its ends, and extending transverse to the axis of the sleeve, is a valve bushing 76. At diametrally opposite sides thereof bushing 76 is provided with a pair of ports 78, which register with the bore 79 of sleeve 70.

Secured by a bracket 80 on plate 74 above bushing 76 is a solenoid 82, which has an armature shaft 83 that projects through plate 74, and into the bore of bushing 76. A spring 84, which is interposed between bracket 80 and a pin 86 carried by shaft 83, tends constantly to urge this shaft downwardly in FIG. 3 so that the lower end of the shaft closes the ports 78 in bushing 76. This blocks the flow of fuel through line 73.

Pivoted intermediate its ends on a pin 88 on shaft 83 is a latching lever 90. Lever 90 is pivotally connected at one end by a pin 92 to a lug 93, which projects upwardly from plate 74.

Figure 3:
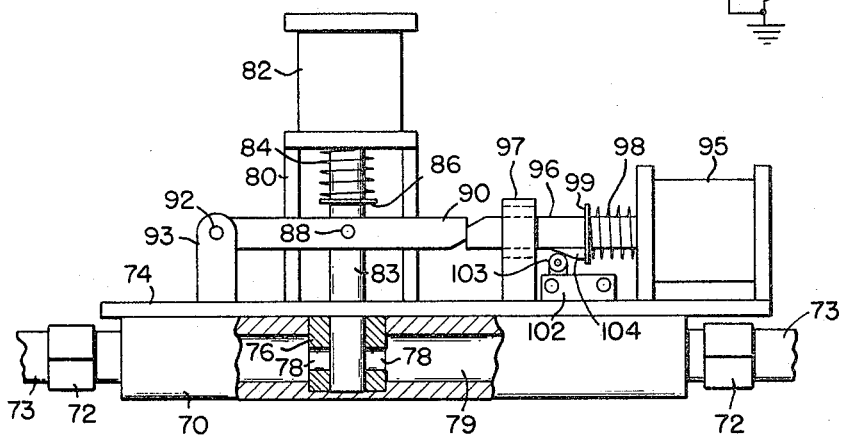
FIG. 3 is a fragmentary elevational view of the fuel line blocking mechanism used in conjunction with the lock.

When solenoid 82 is energized, its armature 83 is drawn upwardly in FIG. 3, thereby unblocking and opening ports 78 in bushing 76, and causing the free end of lever 90 to pivot slightly upwardly or counterclockwise from its position in FIG. 3 about the axis of pin 92.

A second solenoid 95 is secured on the plate 74 with its armature shaft 96 slidable in a guide 97 for reciprocation at right angles to shaft 83. A coiled compression spring 98, which is interposed between a pin 99 on shaft 96, and the housing of the solenoid 95, tends constantly to urge the shaft 96 to its advanced position toward the left in FIG. 3.

Secured to plate 74 beneath the shaft 96 is a normally closed limit switch 102 (FIGS. 2 and 3), having a follower 103, which is engageable by a detent or projection 104 on shaft 96, when the latter is advanced.

In use, the terminal 40 of lock 11 is connected by conductor 105 through a conventional ammeter 106 (FIG. 2) to the positive side of a battery 108; and the terminal 50 is connected by a line 110 to a grounded circuit in which a warning light 112, a warning buzzer 114, and the solenoid 95 are connected in parallel with one another. The light 112 and buzzer 114 may be mounted in any conventional manner on the dashboard 20. The terminal 42 is connected by a line 115 to the automobile's automatic starter mechanism, which is illustrated schematically by the coil 116 in FIG. 2. A further terminal 118, which is mounted in the closure 36 adjacent to the terminal 42, is connected by a line 119 through the solenoid 82 and switch 102 to ground.

When the key 30 is removed from the barrel 16, the contact 48 is held open, and spaced from terminal 50 by the spring 52. However, when the key 30 is inserted completely into the barrel 16 as illustrated in FIG. 1, the inner end of the key engages the projection 28 on the plunger 26, thereby pushing the plunger and the pin 54 slightly to the left in FIG. 1. The lower end of conductor 46 is thus pushed by pin 54 toward the left against the resistance of the spring 52, so that contact 48 is moved to closed position in which it engages the terminal 50 as illustrated in FIG. 1. Since the contacts 44 and 47 are connected at this time by member 58, current flows from the battery 108, through the ammeter 106, line 105, terminal 40, contact 44, member 58, contacts 47 and 48, terminal 50 and line 110 through a circuit containing the buzzer 112, the light 114, and the solenoid 95, and through ground back to the battery. As a result, the buzzer 112 and the light 114 are energized, informing the operator that the ignition key 30 is in OFF position in the lock 11.

To start the automobile engine, the key 30 is rotated in conventional manner slightly beyond its normal ON position against the resistance of the torsion spring 64. This causes the member 58 to be swung counterclockwise in FIG. 2 from between the contacts 44 and 47, thus interrupting the circuit to the buzzer 12, lamp 114, and to the solenoid 95.

This rotation of the key 30 also causes the blade 60 to be rotated counterclockwise in FIG. 2 until the contact 61 engages the terminal 40, and the contact 62 engages both of the terminals 42 and 118. As a result power from the battery passes through the ammeter 106, the terminal 40, the contact 61, the blade 60, the contact 62, and both terminals 118 and 42 to the solenoid 82 and to the starter coil 116, respectively.

The now energized solenoid 82 causes the armature 83 to be drawn upwardly in FIG. 3 to open the ports 78, thus to allow fluid to be pumped through the sleeve 70. Upward movement of armature 83 also causes the lever 90 to be pivoted upwardly, or counterclockwise about the axis of the pin 92 in FIG. 3. Since the solenoid 95 is now deenergized, the spring 98 advances the armature 96 to the left in FIG. 3 beneath the now-elevated lever 90 so that the latter cannot be pivoted downwardly by spring 84 until the armature 96 is once again retracted. As the armature 96 advances to the left in FIG. 3, the projection 104 thereon causes the follower 103 to open the normally-closed limit switch 102, thus deenergizing the solenoid 82 so that the shaft 83 is urged slightly downwardly to engage lever 90 with the now-advanced armature 96.

As soon as the engine is started, and the ignition key 30 is released, the torsion spring 64 rotates the blade 60 slightly to its normal ON position, in which contact 61 is still in engagement with the terminal 40, and contact 62 has become disengaged from the terminal 42 but remains engaged with the terminal 118.

Whenever the key 30 is rotated to its OFF position, as illustrated in FIGS. 1 and 2, the member 58 is swung between and in engagement with the contacts 44 and 47, so as once again to energize the buzzer 112, the lamp 114 and the solenoid 95. As soon as the solenoid 95 is thus energized, its shaft 96 is retracted; and because the solenoid 82 is at this moment deenergized, the spring 84 urges the shaft 86 downwardly into its fuel blocking position as illustrated in FIG. 3. Thus, if the driver gets out of the vehicle without removing the key from the lock, he will be apprised of the situation by the buzzer and the flashing light. Moreover, he will be protected against anyone stealing the car because the fuel line will be blocked by shaft 83.

At this time the free end of the lever 90 confronts the free end of the retracted shaft 96 to hold the latter in its retracted position upon subsequent deenergization of the solenoid 95. This will not occur until key 30 is withdrawn from barrel 16. At this time spring 52 will urge member 46 towards the right in FIG. 1 to disengage its contact 48 from terminal 50. This deenergizes the buzzer 112, the warning lamp 114, and the solenoid 95. The parts are thus returned to the positions illustrated in the drawing, so that the cycle will repeat itself upon the reinsertion of the key 30 into the barrel 16.

From the foregoing it will be apparent that applicant has devised a relatively simple and reliable warning or safety deivce to advise a driver if he inadvertently leaves his key in the ignition lock of his vehicle, and to prevent an unauthorized person from stealing the vehicle anyway if the driver rushes off from the vehicle in such a hurry that he does not hear and does not see or does not heed the warning buzzer and light. Since this novel warning device or system operates immediately upon the turning of an ignition key to its OFF position, it is highly unlikely that a driver will accidentally forget to remove the key from the automobile ignition lock before departing from the auto. This obviates one of the factors which contributes to the large number of auto thefts which occur each year.

Moreover, by employing the automatic fuel blocking device in conjunction with the novel warning system, the likelihood of the vehicle being stolen is materially decreased. If, for example, a thief were to attempt to start the automobile engine by jumping the terminals 40 and 42, the engine would still not run, even though the starting coil 116 were to be energized, because the solenoid 82 would still be deenergized, so that the fuel line would still be blocked.

While in the illustrated embodiment the solenoid 82 is energized from the terminal 118, this solenoid may instead be connected to the terminal 42, so that the solenoid 82 and its series connected switch 102 would be connected in parallel with the coil 116, and thus could be energized only upon engagement of contact 62 with terminal 42. This would cause solenoid 82 to become deenergized upon movement of blade 60 from its starting position to its normal ON position.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. An ignition locking device for an internal combustion engine, comprising a housing, a key-operated barrel mounted in said housing for rotation between ENGINE-OFF and ENGINE-ON positions, a pair of switches mounted in said housing, means connecting said switches to an alarm system and operative, when both said switches are closed, to actuate said alarm system, one of said switches comprising a first contact member connected to said barrel and a second contact member in said housing, said first contact member being disposed to contact said second contact member and close said one switch when said barrel is in ENGINE-OFF position, and to be disengaged from said second contact member to open said one switch, when said barrel is moved to ENGINE-ON position, said other switch comprising a contact fixed relative to said barrel and a contact movable relative to said fixed contact, and a member reciprocable in said barrel and disposed to move the last-named contact into engagement with said fixed contact to close said other switch upon insertion of a key into said barrel, and means resiliently holding said other switch open when said key is withdrawn from said barrel.

2. An ignition locking device for an internal combustion engine, comprising (a) a housing, (b) a key-operated barrel mounted in said housing for rotation between ENGINE-OFF and ENGINE-ON positions, (c) a pair of switches mounted in said housing, (d) means connecting said switches to an alarm system, and operative, when both said switches are closed, to actuate said alarm system, (e) means connected to said barrel and operative to close one of said switches, when said barrel is in ENGINE-OFF position, and to open said one switch, when said barrel is moved to ENGINE-ON position, (f) means operative to close the other switch upon insertion of a key into said barrel, (g) means resiliently holding said other switch open when said key is withdrawn from said barrel, (h) said one switch comprising a first contact movable by said barrel between a pair of spaced contacts in said housing to connect said spaced contacts electrically to one another, when said barrel is in its ENGINE-OFF position, and to disconnect said spaced contacts from one another, when said barrel is moved to its ENGINE-ON position, (i) said other switch comprising a flexible contact connected at one end to one of said spaced contacts, and engageable at its opposite end with a stationary contact on said housing, (j) a spring mounted in said housing to urge said flexible contact out of engagement with said stationary contact, and (k) a reciprocable member engaged at one end with said flexible contact, and engageable at its opposite end by said key for movement thereby to engage said flexible contact with said stationary contact against the resistance of said spring, when said key is inserted into said barrel.

3. An ignition locking device for an internal combustion engine, comprising (a) a housing, (b) a key-operated barrel mounted in said housing for rotation between ENGINE-OFF and ENGINE-ON positions, (c) a pair of switches mounted in said housing, (d) means connecting said switches to an alarm system, and operative, when both said switches are closed, to actuate said alarm system, (e) means connected to said barrel and operative to close one of said switches, when said barrel is in ENGINE-OFF position, and to open said one switch, when said barrel is moved to ENGINE-ON position, (f) means operative to close the other switch upon insertion of a key into said barrel, (g) means resiliently holding said other switch open when said key is withdrawn from said barrel, (h) a third switch mounted in said housing to be opened when said barrel is moved to ENGINE-OFF position, and to be closed, when said barrel is moved to ENGINE-ON position, (i) a valve member mounted to move in the fuel line for the engine between an operative position in which said valve member blocks flow of fuel in said line, and an inoperative position in which fuel is free to flow in said line, and (j) means connected to said switches and operative upon closing of said third switch to move said valve member from operative to inoperative position, and operative, upon the movement of said one switch from its open to its closed position, to move said valve member from inoperative to operative position.

4. An ignition locking device as defined in claim 3, wherein the last-named means comprises (a) a spring urging said valve member toward operative position, (b) a first solenoid operative, when energized, to move said valve member from operative to inoperative position against the resistance of said spring, (c) means for energizing said first solenoid each time said third switch is moved from its open to its closed position, (d) means for deenergizing said first solenoid each time said valve member is moved to its inoperative position, and before said third switch is returned to its open position, and (e) means for releasably holding said valve member in inoperative position after the deenergization of said first solenoid, and until said one switch is closed.

5. An ignition locking device as defined in claim 1, including (a) a third switch mounted in said housing, (b) means for opening said third switch, when said barrel is in ENGINE-OFF position, and for closing said third switch, when said barrel is in ENGINE-ON position, and (c) means connected to said switches and operative to block the fuel line for the motor associated with said device, when said third switch is opened, and operative, when said third switch is closed, to unblock said fuel line.

6. An ignition locking device as defined in claim 5, wherein the last-named means comprises
(a) a plunger mounted for reciprocation transversely of said fuel line between an operative position in which said plunger blocks said line, and an inoperative position in which fuel is free to flow in said line past said plunger,
(b) a spring urging said plunger to one of its two positions,
(c) a first solenoid operative upon the closing of said third switch to move said plunger from said one to the other of its two positions, and
(d) means for releasably holding said plunger in said other position until said third switch is opened.

7. An ignition locking device for an internal combustion engine, comprising
(a) a housing,
(b) a key-operated barrel mounted in said housing for rotation between ENGINE-OFF and ENGINE-ON positions,
(c) a pair of switches mounted in said housing,
(d) means connecting said switches to an alarm system, and operative, when both said switches are closed, to actuate said alarm system,
(e) means connected to said barrel and operative to close one of said switches, when said barrel is in ENGINE-OFF position, and to open said one switch, when said barrel is moved to ENGINE-ON position,
(f) means operative to close the other switch upon insertion of a key into said barrel,
(g) means resiliently holding said other switch open when said key is withdrawn from said barrel,
(h) a third switch mounted in said housing,
(i) means for opening said third switch, when said barrel is in ENGINE-OFF position, and for closing said third switch, when said barrel is in ENGINE-ON position,
(j) means connected to said switches and operative to block the fuel line for the motor associated with said device, when said third switch is opened, and operative, when said third switch is closed, to unblock said fuel line, the last-named means comprising
(k) a plunger mounted for reciprocation transversely of said fuel line between an operative position in which said plunger blocks said line, and an inoperative position in which fuel is free to flow in said line past said plunger,
(l) a spring urging said plunger to one of its two positions,
(m) a first solenoid operative upon the closing of said third switch to move said plunger from said one to the other of its two positions, and
(n) means for releasably holding said plunger in said other position until said third switch is opened, said holding means comprising
(o) a second solenoid connected to said pair of switches and having an armature which is retracted, when both switches of said pair are closed,
(p) a latch on said plunger engageable with said armature, when the latter is retracted and said plunger is in said one position, thereby to hold said armature in its retracted position,
(q) a second spring for advancing said armature beneath said latch, when said plunger is moved from said one to said other position, and
(r) means operative to deenergize said first solenoid upon the advance of said armature,
(s) said latch being engageable, upon the deenergization of said first solenoid, with the advanced armature releasably to support said plunger in said other position against the resistance of the first-named spring.

8. An ignition locking device for an internal combustion engine, comprising
(a) a housing,
(b) a key-operated barrel mounted in said housing for rotation between ENGINE-OFF and ENGINE-ON positions,
(c) a pair of switches mounted in said housing,
(d) means connecting said switches to an alarm system, and operative, when both said switches are closed, to actuate said alarm system,
(e) means connected to said barrel and operative to close one of said switches, when said barrel is in ENGINE-OFF position, and to open said one switch, when said barrel is moved to ENGINE-ON position,
(f) means operative to close the other switch upon insertion of a key into said barrel,
(g) means resiliently holding said other switch open when said key is withdrawn from said barrel,
(h) a first solenoid having a first armature reciprocable between an operative position in which it blocks the fuel line for the engine associated with said device, and an inoperative position in which said armature does not interfere with the flow of fluid in said line,
(i) a first spring urging said first armature to its operative position,
(j) a latch reciprocable with said first armature,
(k) a second solenoid having a second armature reciprocable transverse to said first armature between a retracted position, and an advanced position in which it is engaged beneath said latch to hold said first armature releasably in its inoperative position,
(l) a third switch in said housing operative to energize said first solenoid upon the movement of said barrel from its ENGINE-OFF to its ENGINE-ON position, to move said first armature to its inoperative position,
(m) a second spring operative to urge said second armature into its advanced position upon the movement of said first armature to its inoperative position,
(n) a fourth switch operated upon the advance of said second armature to deenergize said first solenoid, and
(o) means connecting said second solenoid to the first-named pair of switches to be energized thereby each time said barrel is moved to ENGINE-OFF position, thereby to retract said second armature from beneath said latch.

9. An ignition locking device as defined in claim 8, including means mounting said latch on said first armature for movement thereby into registry with said second armature, when said second armature is retracted, whereby when said other switch is opened and said second solenoid is deenergized, said latch engages and holds said second armature in its retracted position against the resistance of said second spring.

References Cited

UNITED STATES PATENTS 2,215,162   9/1940   Scott _____ 340—52

FOREIGN PATENTS 37,158   4/1923   Norway.

MARVIN A. CHAMPION, *Primary Examiner.*

R. L. WOLFE, *Assistant Examiner.*